US008848031B2

(12) United States Patent
Son et al.

(10) Patent No.: US 8,848,031 B2
(45) Date of Patent: Sep. 30, 2014

(54) DIGITAL MICROSCOPE SYSTEM

(75) Inventors: Jin-Wug Son, Anyang (KR); Jin-Whan Yun, Anyang (KR)

(73) Assignee: Huvitz Co., Ltd., Gunpo-Si (KR)

( * ) Notice: Subject to any disclaimer, the term of this patent is extended or adjusted under 35 U.S.C. 154(b) by 404 days.

(21) Appl. No.: 13/325,800

(22) Filed: Dec. 14, 2011

(65) Prior Publication Data
US 2012/0169862 A1 Jul. 5, 2012

(30) Foreign Application Priority Data
Dec. 30, 2010 (KR) .......................... 10-2010-0138962

(51) Int. Cl.
H04N 9/64 (2006.01)
H04N 7/18 (2006.01)
H04N 9/47 (2006.01)
G09G 5/00 (2006.01)
G02B 21/18 (2006.01)
G02B 21/36 (2006.01)
G02B 6/35 (2006.01)
F21V 8/00 (2006.01)

(52) U.S. Cl.
CPC .............. *G02B 21/365* (2013.01); *G02B 21/18* (2013.01); *G02B 6/3598* (2013.01); *G02B 6/3514* (2013.01); *G02B 6/0006* (2013.01)
USPC ................. 348/33; 348/79; 348/80; 348/373; 345/1.1; 700/159

(58) Field of Classification Search
USPC .................................................. 348/61–161
See application file for complete search history.

(56) References Cited

U.S. PATENT DOCUMENTS

| 6,452,625 | B1 * | 9/2002 | Kapitza ........................... 348/80 |
| 7,248,282 | B2 * | 7/2007 | Maddison ....................... 348/79 |
| 7,388,599 | B2 * | 6/2008 | Maddison et al. .............. 348/79 |
| 7,860,289 | B2 * | 12/2010 | Yoo et al. ...................... 382/128 |
| 8,170,698 | B1 * | 5/2012 | Gusack ........................... 700/59 |
| 8,253,788 | B2 * | 8/2012 | Maddison et al. .............. 348/79 |
| 2003/0030747 | A1 * | 2/2003 | Lu et al. ........................ 348/373 |
| 2005/0111088 | A1 * | 5/2005 | Winterot et al. .............. 359/368 |
| 2006/0055625 | A1 * | 3/2006 | Vaccarelli ..................... 345/1.1 |
| 2010/0103253 | A1 * | 4/2010 | Sieckmann et al. ........... 348/79 |
| 2012/0293645 | A1 * | 11/2012 | Maddison et al. .............. 348/79 |

FOREIGN PATENT DOCUMENTS

JP 2005-301065 10/2005

* cited by examiner

*Primary Examiner* — Joseph Ustaris
*Assistant Examiner* — Talha Nawaz
(74) *Attorney, Agent, or Firm* — Lexyoume IP Meister, PLLC

(57) ABSTRACT

Disclosed is a digital microscope system capable of controlling two or more microscope units with a controlling unit. The digital microscope system includes (i) two or more microscope units, (ii) a camera interface, (iii) a controlling unit and (iv) a light output device. The microscope unit includes a lens tube, a digital camera, a light terminator and a stand. The camera interface includes two or more camera interface (I/F) channels and a camera interface channel selector. The controlling unit includes a memory, a display device, a CPU (Central Processing Unit) and a power supply.

4 Claims, 2 Drawing Sheets

DIGITAL MICROSCOPE SYSTEM

This application claims the priority benefits of Korean Patent Application No. 10-2010-0138962 filed on Dec. 30, 2010. All disclosures of the Korean Patent application are incorporated herein by reference.

FIELD OF THE INVENTION

This invention relates to a digital microscope system, and more particularly, to a digital microscope system capable of controlling two or more microscope units with a controlling unit.

BACKGROUNDS OF THE INVENTION

While a traditional upright microscope magnifies an object with an observation tube, a digital microscope is an apparatus for magnifying, observing and measuring an object with a digital camera and a display device installed therein instead of the observation tube. Recently, there are great progresses in the improvements of the digital camera and the display device, and thereby, the digital microscope is also greatly improved and replaces the conventional upright microscope.

US Patent Publication No. 2003/0030747 discloses a microscope system having a bracket for connecting a lens tube of a microscope unit to a digital camera. U.S. Pat. No. 6,452,625 discloses an upright microscope system having a display device instead of an observation tube. The microscope system of U.S. Pat. No. 6,452,625 maintains a conventional objective lens, an objective lens revolver and an illumination device, and thus a continuous zoom function of a digital camera cannot be used for the microscope system, and a size reduction of the microscope system is limited. U.S. Pat. No. 7,248,282 discloses a digital microscope capable of focusing an image by analyzing images of an object.

FIG. 1 is a drawing which shows a conventional digital microscope. As shown in FIG. 1, the conventional digital microscope comprises a main body (controller) 10 and a microscope unit 40. The main body 10 includes a CPU (Central Processing Unit) 12, a display device 14, a memory 16, a SMPS (Switched-Mode Power Supply) 18, a camera I/F (Interface) 20, and a light output device 30 having a light source (for example, a light bulb) 32 and a light channel 34. The microscope unit 40 includes a digital camera 42 connected to the camera I/F 20, a light terminator 44 connected to the light channel 34, a lens tube 46 and a stand 48. In a traditional upright microscope, a magnification ratio is changed by selecting an objective lens by rotating an objective lens revolver which is an objective lens housing including two or more objective lenses. However, in the digital microscope shown in FIG. 1, a plurality of lens tubes 46 should be prepared according to a magnification ratio and/or an observation function of the digital microscope. For example, lens tubes 46 for a low, a medium or a high magnification ratio should be provided according to a magnification ratio of the digital microscope, and lens tubes 46 having a long distance focus function or a polarization function should be provided according to an observation function of the digital microscope. Also, various stands 48 corresponding to the various lens tubes 46 are necessary.

Generally, as shown in FIG. 1, the conventional digital microscope includes only one lens tube 46 of a specific magnification ratio and a specific observation function, and one stand 48. In the digital microscope, in order to change the magnification ratio, namely, in order to use different lens tube 46 and different stand 48, the light terminator 44 and the digital camera 42 which are connected to the original lens tube 46 must be detached from the original lens tube 46 and then re-attached to a new lens tube 46 having a different magnification ratio. The replacement process of the lens tube 46 is inconvenient for a user, and the replaced parts, for example, a lens tube 46, a digital camera 42 can be damaged by frequent replacements, which results in the decrease of the life time of the digital camera.

SUMMARY OF THE INVENTION

Therefore, it is an object of the present invention to provide a digital microscope system capable of controlling two or more microscope units with one controlling unit, wherein the two or more microscope units have different magnification ratios or observation functions.

In order to achieve the object, the present invention provides a digital microscope system comprising: (i) two or more microscope units, each having a lens tube for magnifying an image of an object to be observed and transfer the image to a sensor of a digital camera, the digital camera for converting the image transferred from the lens tubes into digital image data, a light terminator for irradiating observing-light to the object to be observed, and a stand for supporting the lens tubes and the digital cameras; (ii) a camera interface having two or more camera interface channels for receiving digital image data from the digital cameras of the microscope units, and a camera interface channel selector for selecting one of the camera interface channels and transferring the digital image data from the selected camera interface channel; (iii) a controlling unit having a central processing unit for controlling the camera interface channel selector, and receiving the digital image data from the selected camera interface channels, a memory which is connected to the central processing unit, and saves the digital image data transferred from the central processing unit, and a display device which is connected to the central processing unit, and displays the digital image data transferred from the central processing unit; and (iv) a light output device for supplying observing-light to one of the light terminators in accordance with the control of the central processing unit.

The digital microscope system of the present invention includes two or more microscope units having different magnification ratios or observation functions, in which each of the microscope unit includes a lens tube, a stand, a digital camera and a light terminator, and the two or more microscope units are controlled by one controlling unit. Accordingly, without replacing the lens tube and the stand, an object can be observed with a microscope unit having suitable magnification ratio and observation function. The digital microscope system of the present invention is convenient to use, and the durability of the microscope system is superior to the conventional digital microscope.

DETAILED DESCRIPTION OF THE INVENTION

A more complete appreciation of the invention, and many of the attendant advantages thereof, will be better appreciated by reference to the following detailed description.

Figure 1:
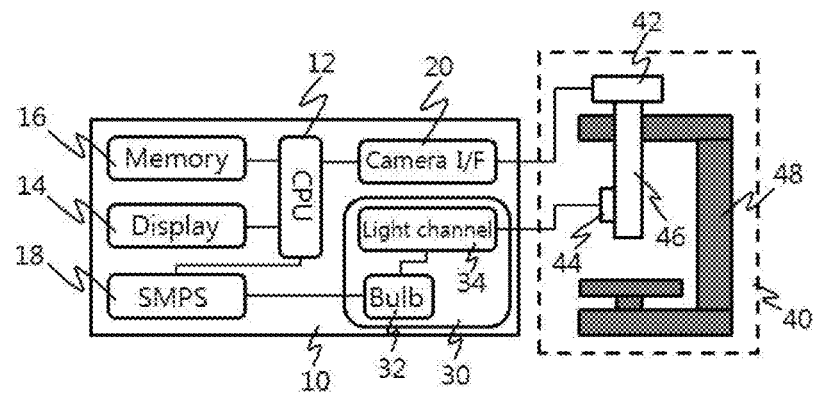
FIG. 1 is a drawing which shows a conventional digital microscope.
Figure 2:
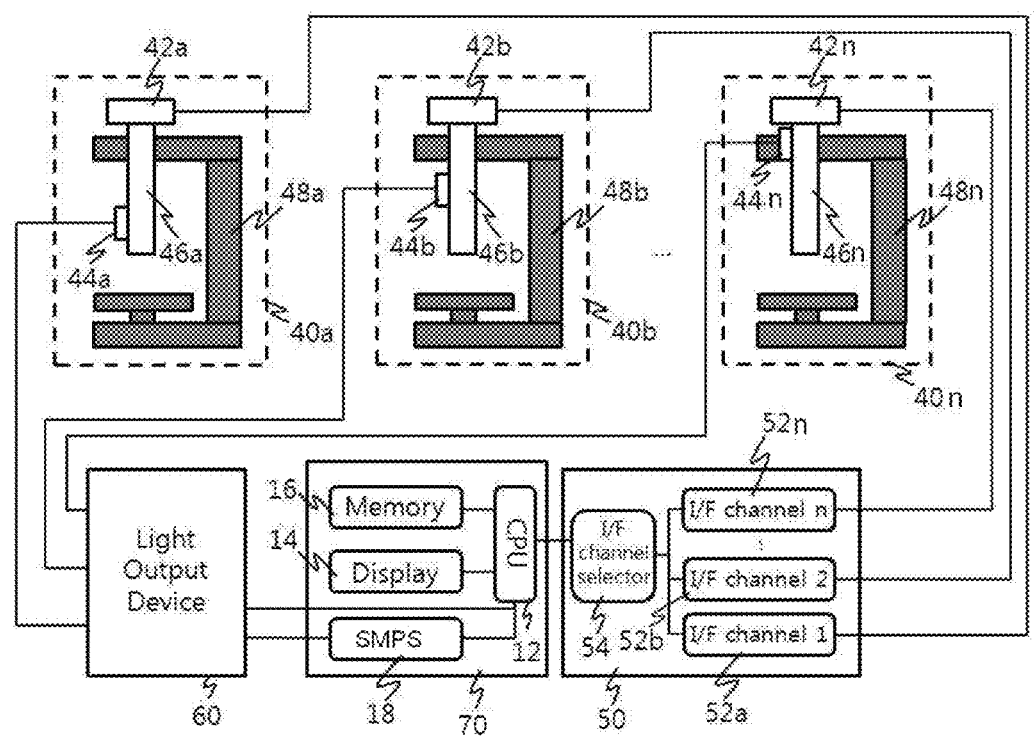
FIG. 2 is a drawing which shows a digital microscope system according to an embodiment of the present invention.

FIG. 2 is a drawing which shows a digital microscope system according to an embodiment of the present invention. As shown in FIG. 2, the digital microscope system according to the present invention comprises (i) two or more microscope units 40a, 40b, . . . , 40n, (ii) a camera interface 50, (iii) a controlling unit 70 and (iv) a light output device 60. The microscope unit 40a, 40b, . . . , 40n includes a lens tube 46a, 46b, . . . , 46n, a digital camera 42a, 42b, . . . , 42n, a light terminator 44a, 44b, . . . , 44n and a stand 48a, 48b, . . . , 48n. The camera interface 50 includes two or more camera interface (I/F) channels 52a, 52b, . . . , 52n and a camera interface channel selector 54. The controlling unit 70 includes a memory 16, a display device 14, a CPU (Central Processing Unit) 12 and a power supply 18.

The microscope unit 40a, 40b, . . . , 40n magnifies an image of an object to be observed and produces digital image data of the magnified image. The number of the microscope unit 40a, 40b, . . . , 40n is two or more, and is determined by the number of the lens tubes 46a, 46b, . . . , 46n which are required for necessary magnification ratios and observation functions. For example, three microscope units having a low, a medium and a high magnification ratio can be used.

The lens tubes 46a, 46b, . . . , 46n of the microscope units 40a, 40b, . . . , 40n magnify an image of an object to be observed and transfer the image to sensors of the digital cameras 42a, 42b, . . . , 42n. A conventional zoom body tube used in a conventional digital microscope may be used as the lens tube 46a, 46b, . . . , 46n of the present invention. The lens tube 46a, 46b, . . . , 46n can be a lens tube having a low, a medium or a high magnification ratio, or can be a lens tube having a long distance focus function or a polarization function, or can be a lens tube having any desired functions. The digital cameras 42a, 42b, . . . , 42n convert the (analogue) image transferred from the lens tubes 46a, 46b, . . . , 46n into digital image data. A conventional digital camera, for example, a CMOS (Complementary Metal Oxide Semiconductor) sensor type digital camera, a CCD (Charge Coupled Device) sensor type digital camera can be used as the digital camera 42a, 42b, . . . , 42n of the present invention. Preferably, the digital camera 42a, 42b . . . , 42n can be a C-mount type digital camera which is fixed to the lens tube 46a, 46b . . . , 46n on the focal distance of the lens tube 46a, 46b, . . . , 46n. Namely, the lens tube 46a, 46b, . . . , 46n and the digital camera 42a, 42b, . . . , 42n can be fixed together in a C-mount type, which is one of standard fixing types of a lens tube and a digital camera.

The light terminators 44a, 44b, . . . , 44n are provided to irradiate observing-light to the object to be observed. The light terminators 44a, 44b, . . . , 44n can be connected to optical fiber cables (OFC) 66a, 66b, 66c shown in FIG. 3, or can be connected to light emitting diodes (LEDs) 67a, 67b, 67c shown in FIG. 4. In these cases, the light terminators 44a, 44b, . . . , 44n work as adapters for connecting the optical fiber cables 66a, 66b, 66c or light emitting diodes 67a, 67b, 67c to the lens tubes 46a, 46b, . . . , 46n. The stands 48a, 48b, . . . , 48n are provided to support the lens tubes 46a, 46b, . . . , 46n and the digital cameras 42a, 42b, . . . , 42n, and various stands 48a, 48b, . . . , 48n can be used according to the type of the lens tubes 46a, 46b, . . . , 46n.

Figure 3:
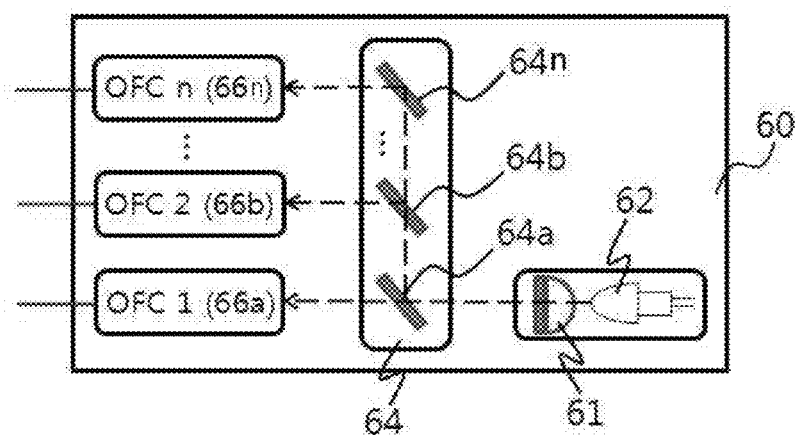
FIG. 3 is a drawing which shows a light output device for the digital microscope system according to an embodiment of the present invention.

As shown in FIG. 3, the camera interface 50 includes two or more camera interface (I/F) channels 52a, 52b, . . . , 52n and the camera interface (I/F) channel selector 54. The camera interface channels 52a, 52b, . . . , 52n receive digital image data from the digital cameras 42a, 42b, . . . , 42n of the microscope units 40a, 40b, . . . , 40n. The camera interface channel selector 54 selects one of the camera interface channels 52a, 52b, . . . , 52n and transfers the digital image data from the selected camera interface channel to the controlling unit 70. As the camera interface 50, a conventional camera selector or a frame grabber can be used, and the camera interface channel selector 54 can be embedded in the camera interface 50. The frame grabber is commercially available, but, if necessary, the frame grabber can also be manufactured by a skilled person in the art. The camera interface 50 may work under conventional communication standards which are applied to a camera link, a USB, a 1394 Firewire, a GigaNet, and so on.

The controlling unit 70 is provided for controlling the microscope units 40a, 40b, . . . , 40n and observing the magnified image of the object, and includes a central processing unit (CPU) 12, a memory 16, a display device 14 and a power supply 18. The CPU 12 controls the camera interface channel selector 54, receives the digital image data from the selected camera interface channels 52a, 52b, . . . , 52n, and processes the received digital image data. The CPU 12 also controls the memory 16, the display device 14, and the power supply 18, and, if necessary, runs a user application program. The memory 16 is connected to the CPU 12, and saves the digital image data and other necessary data transferred from the CPU 12. As the memory 16, a conventional memory, such as a NAND Flash memory, a CF memory card, a SD memory card and so on, can be used. The display device 14 is connected to the CPU 12, and displays the digital image data transferred from the CPU 12. As the display device 14, a conventional monitor (LCD monitor etc.) can be used. The controlling unit 70 may includes the power supply 18 for supplying the electric power to the light source 62 for the optical fiber cables 66a, 66b, . . . , 66n or to the LEDs 67a, 67b, . . . , 67n(See FIGS. 3 and 4). An example of the power supply 18 includes Switched-Mode Power Supply (SMPS).

Figure 4:
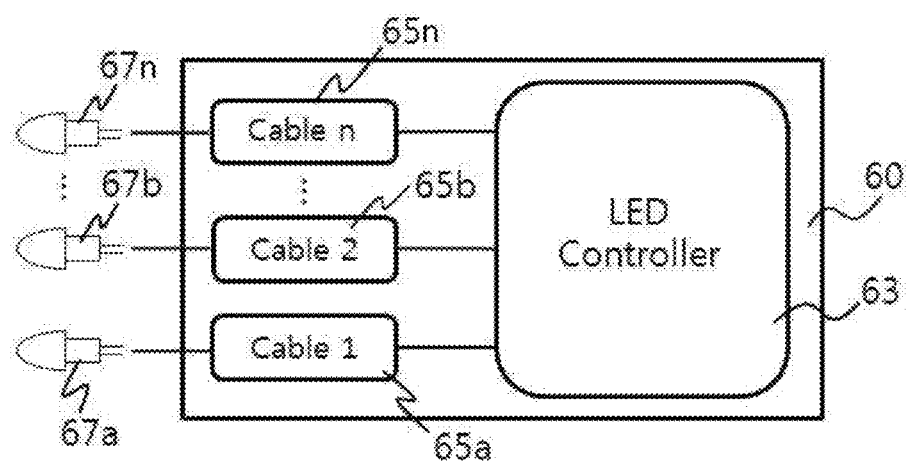
FIG. 4 is a drawing which shows other light output device for the digital microscope system according to an embodiment of the present invention.

FIG. 3 is a drawing which shows a light output device for the digital microscope system according to an embodiment of the present invention. FIG. 4 is a drawing which shows other light output device for the digital microscope system according to an embodiment of the present invention. As shown in FIGS. 2, 3 and 4, the light output device 60 supplies the observing-light to one of the light terminators 44a, 44b, . . . , 44n in accordance with the control of the CPU 12. For example, the light output device 60 supplies light to the optical fiber cables 66a, 66b, . . . , 66n, or supplies electrical power to the LEDs 67a, 67b, . . . , 67n.

As shown in FIG. 3, in an embodiment, the light output device 60 comprises a light source (for example, a light bulb) 62 for receiving electric power from the power supply 18 and generating the observing-light, an optical fiber selector 64 for selectively transferring the observing-light generated from the light source 62 in accordance with the control of the CPU 12, and two or more optical fiber cables 66a, 66b, . . . , 66n which connect the optical fiber selector 64 and the light terminators 44a, 44b, . . . , 44n, respectively, and selectively transfer the observing-light from the optical fiber selector 64 to one of the light terminators 44a, 44b, . . . , 44n. As the light source 62, conventional light bulbs, such as a metal halide bulb, a halogen bulb, an LED (light emitting diode) and so on, can be used. Preferably, a condenser lens 61 can be mounted in front of the light source 62 for concentrating the observing-light. The optical fiber cable 66a, 66b, . . . , 66n can be a conventional optical fiber cable which transfers optical signals or light. As shown in FIG. 3, the optical fiber selector 64 which selectively transfers the observing-light to one of the two or more optical fiber cables 66a, 66b, ..., 66n includes two or more movable (or rotatable) mirrors 64a, 64b, ..., 64n which are positioned at the ends of the two or more optical fiber cables 66a, 66b, ..., 66n. The two or more movable mirrors 64a, 64b, ..., 64n are positioned on the progressing paths of the observing-light (optical axis, dotted lines in FIG. 3), and move or rotate into or out of the progressing paths of the observing-light so as to direct the observing-light to one of the optical fiber cables 66a, 66b, ..., 66n. For example, when the first optical fiber cable 66a is used, the first movable mirror 64a rotates or moves to be not located on the progressing path of the observing-light (for example, rotates to be parallel to the progressing path), and the observing-light from the light source 62 is directed to the first optical fiber cable 66a. When the second optical fiber cable 66b is used, the first movable mirror 64a rotates or moves to be located on the progressing path of the observing-light, and reflects the observing-light from the light source 62 with 90 degree. At the same time, the second movable mirror 64b is located on the progressing path of the observing-light, and again reflects the observing-light with 90 degree. Then, the observing-light is directed to the second optical fiber cable 66b. When the n-th optical fiber cable 66n is used, the first movable mirror 64a rotates or moves to be located on the progressing path of the observing-light, and reflects the observing-light from the light source 62 with 90 degree. At the same time, the movable mirrors 64b, ..., 64n−1 rotate or move to be not located on the progressing path of the observing-light, and thereby do not change the direction of the observing-light. The n-th movable mirror 64n is located on the progressing path of the observing-light, and again reflects the observing-light with 90 degree. Then, the observing-light is directed to the n-th optical fiber cable 66n. The numbers of the optical fiber cables 66a, 66b, ..., 66n and the movable mirrors 64a, 64b, ..., 64n of the optical fiber selector 64 depend on the number of the microscope units 40a, 40b, ..., 40n.

As shown in FIG. 4, in other embodiment, the light output device 60 comprises two or more LEDs 67a, 67b, ..., 67n which are connected to the light terminators 44a, 44b, ..., 44n of the microscope units 40a, 40b, ..., 40n and irradiate the observing-light to the light terminators 44a, 44b, ..., 44n, and a LED (light emitting diode) controller 63 for selectively activating one of the LEDs 67a, 67b, ..., 67n in accordance with the control of the CPU 12. The LEDs 67a, 67b, ..., 67n can be powered by the power supply 18. The LEDs 67a, 67b, ..., 67n and the LED controller 63 can be connected with two or more cables 65a, 65b, ..., 65n for power supply. The number of the LEDs 67a, 67b, ..., 67n depends on the number of the microscope units 40a, 40b, ..., 40n.

The digital microscope system of the present invention controls and utilizes two or more digital microscope units with the camera interface 50 and the light output device 60. Therefore, the replacements of the lens tube, the stand, and the digital camera are not necessary.

While the present invention has been shown and described with reference to certain preferred embodiments thereof, it will be understood by those skilled in the art that various changes in form and details may be made therein without departing from the spirit and scope of the invention as defined by the appended claims. For example, the camera interface 50 and the light output device 60 may be separated from the controlling unit 70, or may be integrated into the controlling unit 70.

The invention claimed is:

1. A digital microscope system comprising:
   two or more microscope units, each having a lens tube for magnifying an image of an object to be observed and transfer the image to a sensor of a digital camera, the digital camera for converting the image transferred from the lens tubes into digital image data, a light terminator for irradiating observing-light to the object to be observed, and a stand for supporting the lens tubes and the digital cameras;
   a camera interface having two or more camera interface channels for receiving digital image data from the digital cameras of the microscope units, and a camera interface channel selector for selecting one of the camera interface channels and transferring the digital image data from the selected camera interface channel;
   a controlling unit having a central processing unit for controlling the camera interface channel selector, and receiving the digital image data from the selected camera interface channels, a memory which is connected to the central processing unit, and saves the digital image data transferred from the central processing unit, and a display device which is connected to the central processing unit, and displays the digital image data transferred from the central processing unit; and
   a light output device for supplying observing-light to one of the light terminators in accordance with the control of the central processing unit,
   wherein the light output device comprises a light source for generating the observing-light, an optical fiber selector for selectively transferring the observing-light generated from the light source in accordance with the control of the central processing unit, and two or more optical fiber cables which connect the optical fiber selector and the light terminators, respectively, and selectively transfer the observing-light from the optical fiber selector to one of the light terminators.

2. The digital microscope system of claim 1, wherein the optical fiber selector comprises two or more movable mirrors which are positioned at the ends of the two or more optical fiber cables and on the progressing paths of the observing-light, and move into or out of the progressing paths of the observing-light so as to direct the observing-light to one of the optical fiber cables.

3. The digital microscope system of claim 1, wherein the light output device comprises two or more light emitting diodes which are connected to the light terminators and irradiate the observing-light to the light terminators, and a light emitting diode controller for selectively activating one of the light emitting diodes in accordance with the control of the central processing unit.

4. The digital microscope system of claim 1, wherein the camera interface and the light output device are integrated into the controlling unit.

* * * * *